(12) United States Patent
Palm

(10) Patent No.: US 8,965,358 B2
(45) Date of Patent: Feb. 24, 2015

(54) METHODS AND ARRANGEMENTS FOR PROCESSING OF MEASUREMENT DATA IN CELLULAR COMMUNICATION SYSTEMS

(75) Inventor: Håkan Palm, Växjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 116 days.

(21) Appl. No.: 13/703,238

(22) PCT Filed: Apr. 29, 2011

(86) PCT No.: PCT/SE2011/050531
§ 371 (c)(1),
(2), (4) Date: Dec. 10, 2012

(87) PCT Pub. No.: WO2011/162665
PCT Pub. Date: Dec. 29, 2011

(65) Prior Publication Data
US 2013/0122891 A1    May 16, 2013

Related U.S. Application Data

(60) Provisional application No. 61/356,823, filed on Jun. 21, 2010.

(51) Int. Cl.
*H04W 24/00* (2009.01)
*H04W 24/10* (2009.01)

(52) U.S. Cl.
CPC .............. *H04W 24/00* (2013.01); *H04W 24/10* (2013.01)
USPC ........ 455/423; 455/422.1; 455/424; 455/425; 455/67.11

(58) Field of Classification Search
CPC ............................. H04W 24/00; H04W 24/10
USPC .................... 455/422.1, 423, 424, 425, 67.11
See application file for complete search history.

(56) References Cited

U.S. PATENT DOCUMENTS 7,099,669 B2 *  8/2006  Sheffield ....................... 455/446
2011/0195668 A1 *  8/2011  Lee et al. ................... 455/67.11

OTHER PUBLICATIONS

3rd Generation Partnership Project; Technical Specification Group Radio Access Network; "Study on Minimization of drive-tests in Next Generation Networks"; 3GPP TR 36.805; Dec. 2009; pp. 1-24; Release 9; 3GPP, Mobile Competence Centre, 650, route des Lucioles, 06921 Sophia-Antipolis Cedex, France.

(Continued)

*Primary Examiner* — Barry Taylor
(74) *Attorney, Agent, or Firm* — Coats & Bennett, PLLC

(57) ABSTRACT

The problem of unsynchronized internal clocks of user equipments in a cellular communication system is addressed by a solution where a mechanism relying on a standalone clock function in user equipments is provided. Embodiments provide a network node that distributes a time reference to a user equipment (UE), and wherein the UE, using an internal clock function, time-stamps the logged measurements and/or events relative to the received time reference. When the UE has logged measurements the UE indicates to the network node that it has an available measurement log. The network node may then request several UEs to deliver their measurement log, respectively. The network node is then able to retrieve time stamped measurement information from the measurement log of each UE relative to the sent time reference. Furthermore, the network node is then able to compare measurement information from each UE in a cell provided at the same time interval in all UEs.

22 Claims, 5 Drawing Sheets

(56) References Cited

OTHER PUBLICATIONS

TD Tech; "Time Stamp Achievement and Reporting in MDT"; 3GPP TSG-RAN WG2 Meeting #69bis, Beijing, China; Apr. 12-16, 2010; pp. 1-3; R2-102495; 3GPP, Mobile Competence Centre, 650, route des Lucioles, 06921 Sophia-Antipolis Cedex, France.

Nokia Siemens Networks et al; "Logged Mdt Principles"; 3GPP TSG-RAN WG2 Meeting #70; Montreal, Canada; May 10-14, 2010; pp. 1-4; R2-103191; 3GPP, Mobile Competence Centre, 650, route des Lucioles, 06921 Sophia-Antipolis Cedex, France.

Ericsson et al; "Time Stamp Mechanism for Logged MDT"; 3GPP TSG RAN WG2 #70bis, Stockholm, weden;.May 28 - Jun. 2, 2010; pp. 1-2; R2-103903; 3GPP, Mobile Competence Centre, 650, route des Lucioles, 06921 Sophia-Antipolis Cedex, France.

Teliasonera; "Possible Measurements for Minimising Drive Tests"; 3GPP TSG-RAN WG2 #65bis; Seoul, South Korea; Mar. 23-27, 2009; pp. 1-2; R2-092024; 3GPP, Mobile Competence Centre, 650, route des Lucioles, 06921 Sophia-Antipolis Cedex, France.

QUALCOMM Europe; "MDT: Measurement Capability"; 3GPP TSG-RAN WG2 Meeting #67, Shenzhen, China; Aug. 24-28, 2009; pp. 1-2; R2-094294; 3GPP, Mobile Competence Centre, 650, route des Lucioles, 06921 Sophia-Antipolis Cedex, France.

CATT; "Time Stamp in Minimization Drive Test"; 3GPP TSG RAN WG2 Meeting #68, Jeju, Korea; Nov. 9-Nov. 13, 2009; pp. 1-3; R2-096668; 3GPP, Mobile Competence Centre, 650, route des Lucioles, 06921 Sophia-Antipolis Cedex, France.

Nokia Corporation et al; "Time Stamp for Minimization of Drive Test"; 3GPP TSG-RAN WG2 Meeting #67bis, Miyazaki, Japan; Oct. 12-16, 2009; pp. 1-3; R2-095640; 3GPP, Mobile Competence Centre, 650, route des Lucioles, 06921 Sophia-Antipolis Cedex, France.

* cited by examiner

METHODS AND ARRANGEMENTS FOR PROCESSING OF MEASUREMENT DATA IN CELLULAR COMMUNICATION SYSTEMS

TECHNICAL FIELD

The present invention relates to processing of measurement data. More particularly, the present invention relates to arrangements and methods for processing of measurement data in a user equipment and a network node comprised in a cellular communication system.

BACKGROUND

For next generation of mobile telecommunications systems $3^{rd}$ Generation Partnership Project (3GPP) is in the process of defining solutions for user equipment (UE) measurement logging function and immediate reporting function called Minimization of the Drive Tests (MDT). The MDT study aims at assessing the feasibility, benefits and complexity of automating the collection of UE measurements to minimize the need of manual drive-tests. The work under the MDT study should define use cases and requirements for minimizing drive-tests in next generation LTE/HSPA networks. Also, based on the defined use cases and requirements, the MDT should focus on study the necessity of defining new UE measurements logging and reporting capabilities for minimizing drive tests and analyze the impact on the UE.

The use cases for the MDT will be given as following.
Radio coverage optimization
Mobility optimization
Network capacity optimization
Parameterization for common channels
Quality of Service verification 1. Radio coverage optimization; that is, information about radio coverage is essential for network planning, network optimization and Radio Resource Management (RRM) parameter optimization (e.g. idle mode mobility parameter setting, common channel parameterization), as well as back-end network management activities, such as network dimensioning, CAPEX/OPEX planning and marketing. Additionally the detection of coverage problems (e.g. coverage holes, pilot pollution, low user throughput, etc.) in specific areas may be performed.

2. Mobility optimization; that is, mobility optimization is an important part of network operation. Information about mobility problems or failures can be used to identify localized lack of coverage or the need to adapt the network parameters setting, (e.g. in order to avoid too early or too late handover and to improve the handover success rate and overall network performance)

3. Network capacity optimization; that is, the operator may need to be able to determine if there is too much/little capacity in certain parts of the network. Such determination may help to determine placement of new cells, to configure common channels and to optimize other capacity related network parameters.

4. Parameterization for common channels; that is, user experience and/or network performance can be degraded by suboptimal configuration of common channels (e.g. random access, paging and broadcast channels). Detecting problems (e.g. on UL or DL common channel coverage) or analyzing the performance (e.g. connection setup delay) for the procedures associated with common channels, may help network parameter setting and configuration change for system performance optimization.

5. Quality of Service verification; that is, one of the objectives of the network performance analysis is the verification of the quality of service (e.g. user throughput). This may also allow detecting critical conditions and determining the need to change the network configuration, parameter settings or capacity extension.

In the following, UE measurement logs for minimizing drive tests will be described. The measurement logs may be taken at the occurrence of predefined "triggers", e.g. periodic trigger, a failure event. The following UE measurements (or similar functionality) are considered for UE-internal logging:

1. Periodical downlink pilot signal strength/quality measurements of serving cell and neighbour cells on same and other radio access technologies.

2. Serving cell becomes worse than threshold; that is, radio environment measurements are logged when the serving cell metric becomes worse than the configured threshold.

3. Transmit power headroom becomes less than threshold; that is, transmit power headroom and radio environment measurements are logged when UE transmit power headroom becomes less than the configured threshold.

4. Random access failure; that is, details on the random access and radio environment measurements are logged when a random access failure occurs.

5. Paging channel failure; that is, details of the radio environment, location, time and cell identity are logged at the point when the UE fails to decode the PCCH on the Paging channel for two consecutive times.

6. Broadcast channel failure; that is, details of the radio environment, location, time, cell identity and frequency are logged at the point when the UE fails to read the relevant DL common channels to acquire required system information for camping on a cell.

7. Radio link failure report; that is, radio measurements available at the UE are reported at the RLF occurrence.

The network can request the UE to perform logging of measurements. The UE executes measurements (e.g. periodical downlink pilot measurements) and logs these measurements internally in a sequential manner. Typically, the log stored internally in the UE will contain e.g. some hour of logged measurement information. For post-processing purpose, these logged measurements/events may be tagged with time information (e.g., time stamps).

When the UE has logged measurements the UE indicates to the network that it has an available measurement log. The network may then request the UE to deliver the measurement log. This procedure is illustrated in FIG. 1. The UE sends 10 an indication to a network node, e.g. an eNodeB or a RNC (Radio Network Controller), that it has an available measurement log. The network node then determines 11 whether is wants to request the measurement log. If it determines to request the measurement log it sends 12 a request to the UE. Thereupon the UE delivers 13 the measurement log to the network node.

The network collects measurement logs from several UEs in different cells. By collecting and retrieving information from the measurement logs the network is able to perform optimization of radio coverage, mobility, network capacity and to perform parameterization for common channels and verification of QoS.

It has been agreed upon to include a time stamping for the MDT measurements. However, the timestamp does not need to be very accurate. It is recognized that a simple mechanism is sufficient. For example, during a log activity of e.g. one hour, one can assume that a drift of approximately ±10 s is acceptable.

Solutions using Global Positioning System (GPS), as well as other network-broadcast time-of-day information have been discussed. A mechanism that e.g. uses System Frame Number (SFN) of the current cell as timing source has the potential of providing a very accurate time reference. However, a UE will change cells and occasionally even lose cell coverage causing problems with the time stamping during the performance of UE measurement logging function.

Most user equipments are equipped with a clock. However, in many cases the clocks of the user equipments are not synchronized with a common time base, e.g. the local time. If the UE utilizes the internal clock when time stamping measurement data, problems will arise when the network retrieves time stamped measurement information from the measurement logs and compare the time stamp measurement information from several UEs in a cell.

The document "Study on Minimization of drive-tests in Nest Generation Networks; (Release 9)", $3^{rd}$ Generation Partnership Project; Technical Specification Group Radio Access Network; 3GPP TR 36.805, V9.0.0, 21 Dec. 2009, pages 1-24, discusses automating the collection of UE measurements, i.e. MDT, by executing measurements in the UE. It further discloses storing the measurements in a measurement log wherein the measurements are linked to a time stamp that is available in the UE and receiving a request to deliver the log in the UE. Thereupon the log is delivered to the network node. However, the accuracy of the time information is underdetermined.

The document "Time stamp achievement and reporting in MDT", TD TECH, 3GPP DRATFT; R2-102495, 4 Apr. 2010 relates to the issue of the accuracy of time information in MDT. It discusses a mechanism of reporting time stamp via RRC signalling. A relative time is used for the time stamp of the measurement in the UE. The relative time is linked to a counter which is turned on in the UE when measurement is triggered. However, the network node does not know the accuracy of the time information in the log.

The document "Logged MDT principles", NOKIA SIEMENS NETWORKS et al, 3GPP DRAFT; R2-103191, 4 May 2010 relates to configuration and reporting of a measurement log for MDT but does not mention the accuracy of the time information.

SUMMARY

The object of the present invention is to address some of the problems and disadvantages outlined above, and to provide methods and arrangements that enable processing of measurement data in a cellular communication system.

The above stated object is achieved by means of the methods and the arrangements according to the independent claims.

In accordance with a first aspect of embodiments, a method in a user equipment for enabling processing of measurement data is provided. The user equipment is configured to communicate with a network node comprised in a cellular communication system. The user equipment comprises a measurement log for storing measurement data and time reference information. Furthermore, the method comprising receiving a time reference from the network node. Moreover, an internal clock function is started at the reception of the time reference. One or more measurement is then executed and measurement data is stored with a determined value of the internal clock function in the measurement log. Furthermore, the method comprising sending an indication to the network node that the measurement log is available. A request to deliver the measurement log is received from the network node. Finally, the method comprising delivering the measurement log to the network node.

In accordance with a second aspect of embodiments, a user equipment for enabling processing of measurement data is provided. The user equipment is configured to communicate with a network node comprised in a cellular communication system. The user equipment comprises a storage unit for storing a measurement log in which measurement data and time reference information are stored. The user equipment further comprises a transceiver adapted to receive a time reference from the network node and a processor unit adapted to start an internal clock function when the time reference is received, execute a measurement, and store the measurement data with a determined value of the internal clock function in the measurement log. Moreover, the transceiver is further adapted to send an indication to the network node that the measurement log is available and to receive a request to deliver the measurement log from the network node and thereupon to deliver the measurement log to the network node.

In accordance with a third aspect of embodiments, a method in a network node for processing of measurement data is provided. The network node is comprised in a cellular communication system and configured to communicate with at least two user equipments. The method comprising, for each user equipment, sending a time reference to the user equipment. Furthermore, the method comprising receiving an indication from the user equipment that a measurement log is available and sending a request to deliver the measurement log to the user equipment. Moreover, the method comprising receiving the measurement log from the user equipment and comparing the measurement logs of at least two user equipments by comparing measurement data logged at a value of time of an internal clock function of the respective user equipment with respect to the sent time references.

In accordance with a fourth aspect of embodiments, a network node for processing of measurement data is provided. The network node is comprised in a cellular communication system and configured to communicate with at least two user equipments. The network node comprises a transceiver adapted to, for each user equipment, send a time reference to the user equipment and to receive an indication from the user equipment that a measurement log is available. The transceiver is further adapted to send a request to deliver the measurement log to the user equipment and to receive the measurement log from the user equipment. The network node further comprises a processor unit adapted to compare the measurement logs of at least two user equipments by comparing measurement data logged at a value of time of an internal clock function of the respective user equipment with respect to the sent time references.

An advantage of particular embodiments is that they provide a solution to the stated object which offers simple implementation and operational simplicity without requiring complex arrangements in the user equipment or in the network.

A further advantage of particular embodiments is that they provide a solution which does not require synchronization of clocks in the user equipment and the network.

Further advantages and features of embodiments will become apparent when reading the following detailed description in conjunction with the drawings.

BRIEF DESCRIPTION OF THE DRAWINGS

For a better understanding, reference is made to the following drawings and preferred embodiments.

DETAILED DESCRIPTION

Figure 1:
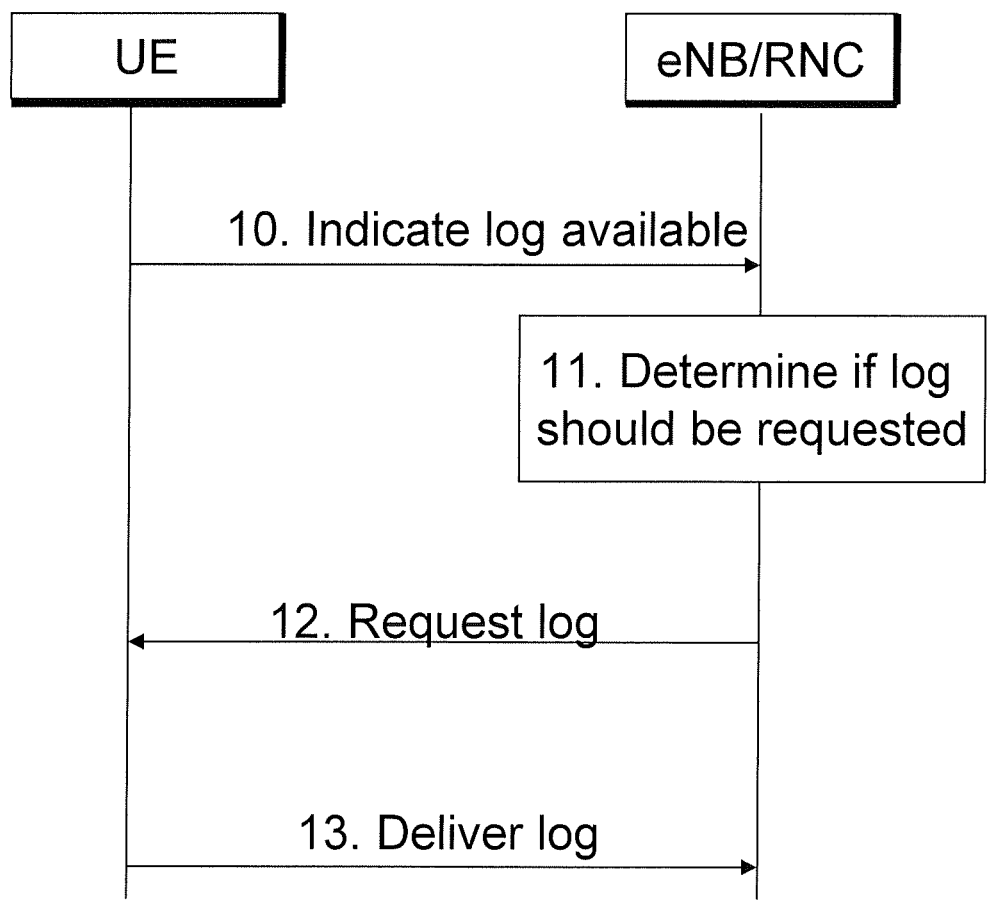
FIG. 1 illustrates the prior art procedure of reporting of the measurement log from the user equipment to the network.

In the following description, for purposes of explanation and not limitation, specific details are set forth, such as particular sequences of steps and particular device configurations in order to provide a thorough understanding of the embodiments. It will be apparent to one skilled in the art that the embodiments may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Embodiments are described herein by way of reference to particular example scenarios. Particular aspects are described in a non-limiting general context in relation to an LTE system. It should though be noted that the invention and its exemplary embodiments may also be applied to other types of radio access networks for processing measurement data.

In the following detailed description a number of embodiments are disclosed wherein the problem of unsynchronized internal clocks of user equipments in a cellular communication system is addressed by a solution where a mechanism relying on a standalone clock function in user equipments is provided. Embodiments described in more detail in the following provide a network node that distributes a time reference to a user equipment (UE), and wherein the UE, using an internal clock function, time-stamps the logged measurements and/or events relative to the received time reference. When the UE has logged measurements the UE indicates to the network node that it has an available measurement log. The network node may then request several UEs to deliver their measurement log, respectively. The network node is then able to retrieve time stamped measurement information from the measurement log of each UE relative the sent time reference. Furthermore, the network node is then able to compare measurement information from each UE in a cell provided at the same time interval in all UEs.

According to one exemplary embodiment, a network node comprised in a cellular communication system, e.g. a LTE system, communicates with UEs in a serving cell. The network node sends a time reference to a UE. For example, the network node could include the time reference in a MDT (Minimization of the Drive Tests) measurement configuration message sent to the UE when the network requests the UE to perform logging of measurements. The time reference could e.g. be a time-of-day and date indication. The exact content does not need not be standardized, and can instead be left for the choice of the operator of the cellular communication system. Furthermore, at reception of the MDT measurement configuration message including the time reference, the UE starts an internal clock function or a clock counter from zero, and steps it e.g. by one every second. The UE additionally stores the time reference in the measurement log. Thereupon the UE is able to "timestamp" each subsequently logged MDT measurement with the current value of the internal clock function, and adds this to the measurement log.

Figure 2:
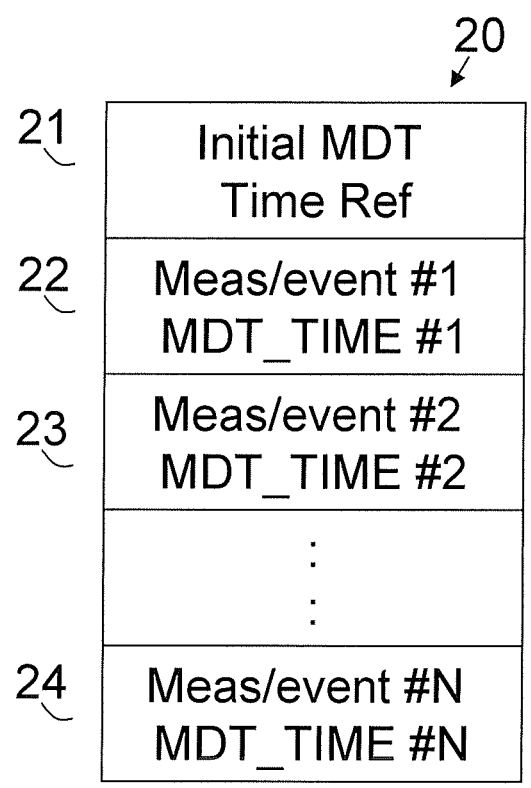
FIG. 2 shows an exemplary embodiment of a structure of the user equipment measurement log stored internally in the user equipment and reported to the network node.

FIG. 2 illustrates an exemplary embodiment of a structure of the measurement log stored internally in the UE and reported to the network node, including measurement and time information. The measurement log 20 comprises the time reference Initial MDT Time Ref 21 received from the network node. It further comprises a first MDT measurement 22 which is timestamped i.e. the MDT measurement is stored in the log with the current value of the internal clock function MDT_TIME at the time of measuring. The measurement log also comprises a second MDT measurement 23 which is timestamped in the same manner. The log may include several timestamped MDT measurements 24 as illustrated in FIG. 2. Typically, the measurement log will include e.g. some hour of logged measurement information.

Figure 3:
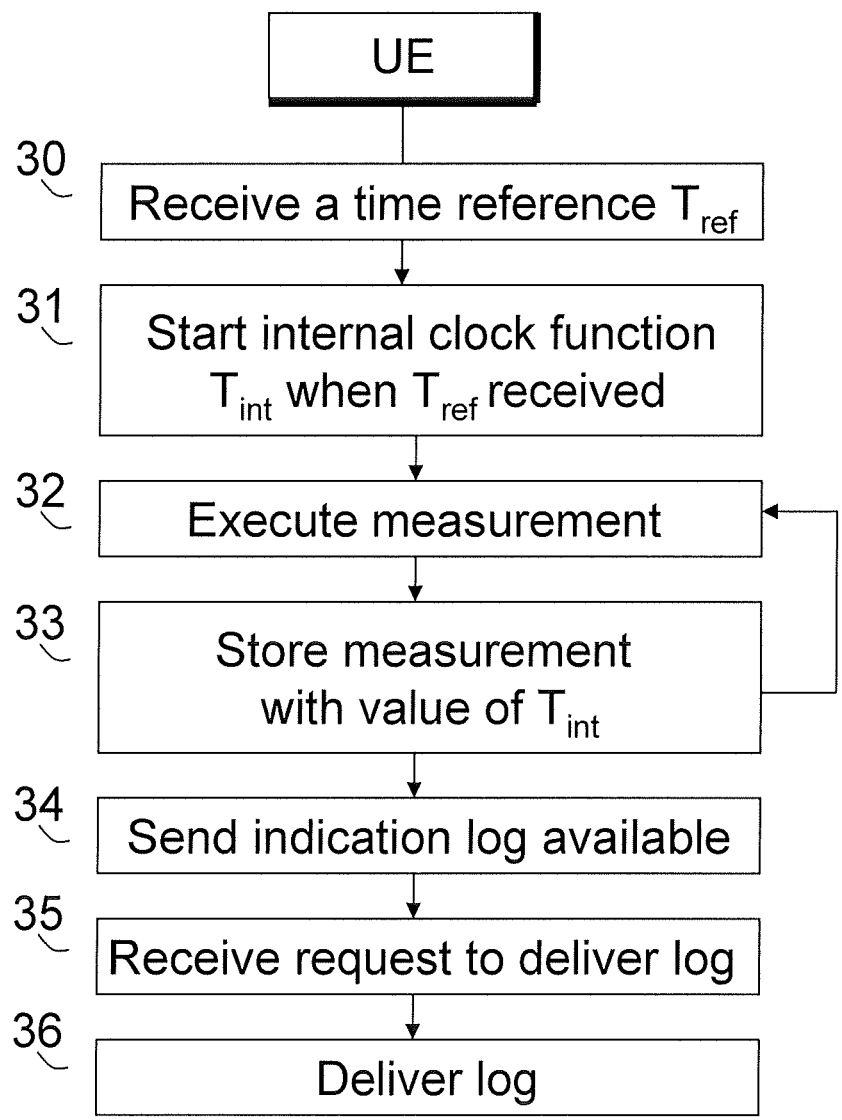
FIG. 3 shows a flowchart of an exemplary embodiment of a method in a user equipment for enabling processing of measurement data.

In FIG. 3 an exemplary embodiment of a method in a UE for enabling processing of measurement data is illustrated. The UE is configured to communicate with a network node comprised in a cellular communication system. In a first step 30 the UE receives a time reference $T_{ref}$ from the network node. The time reference may be included in the same message which is sent to the UE from the network node requesting the UE to start logging measurements such as the MDT measurement configuration message. Then in a next step 31, the UE starts an internal clock function $T_{int}$ upon the reception of the time reference $T_{ref}$. The UE starts executing measurements in the cell in a further step 32. The measurement may be any of the measurements required for MDT functionality. For example, the measurement executed may be a downlink pilot signal strength measurement of serving or neighbour cell. It may also be a downlink pilot signal quality measurement of serving or neighbour cell. It should be noted that the measurements could be executed periodically in the UE. When the measurement is executed the UE stores 33 the measurement data in a measurement log in the UE. The measurement data is stored with a current value of the internal clock function $T_{int}$ in the measurement log i.e. the measurement data is stored with a timestamp in the log. The UE sends 34 an indication to the network node that the measurement log is available. In a further step 35 the UE receives a request from the network node to deliver the measurement log to the network node. The UE then delivers 26 the measurement log comprising the timestamped measurement data and the time reference $T_{ref}$ to the network node.

Figure 4:
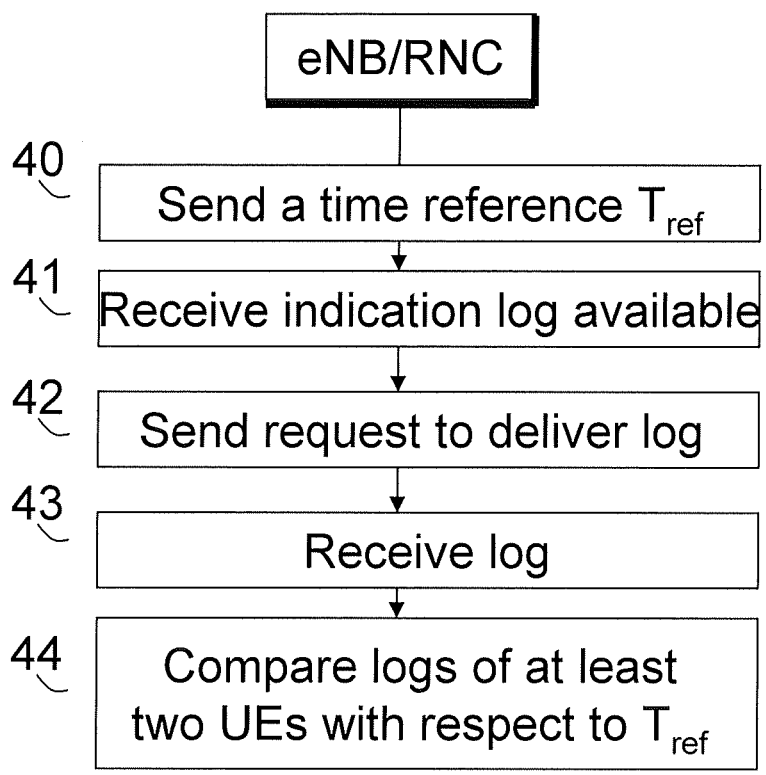
FIG. 4 shows a flowchart of an exemplary embodiment of a method in a network node for processing of measurement data.

In FIG. 4 an exemplary embodiment of a method in a network node for processing of measurement data is illustrated. The network node is comprised in a cellular communication system and configured to communicate with at least two user equipments in a cell which is served by the network node. In a first step 40 the network node sends a time reference $T_{ref}$ to each UE. The time reference $T_{ref}$ may be included in the same message which is sent to the UE requesting the UE to start logging measurements, such as the MDT measurement configuration message. The UE will start logging measurement data in a measurement log in accordance with the previously described method. In a further step 41 an indication is received from the UE that a measurement log is available in the UE. Next, the network node sends 42 a request to deliver the measurement log to the UE. The network node receives the measurement log in a further step 43. Upon the reception of measurement logs of at least two UEs the network node can compare 44 the measurement logs. This step is performed by comparing measurement data logged at a value of time of an internal clock function of the respective user equipment with respect to the time references $T_{ref}$ sent to each UE, respectively.

Figure 5:
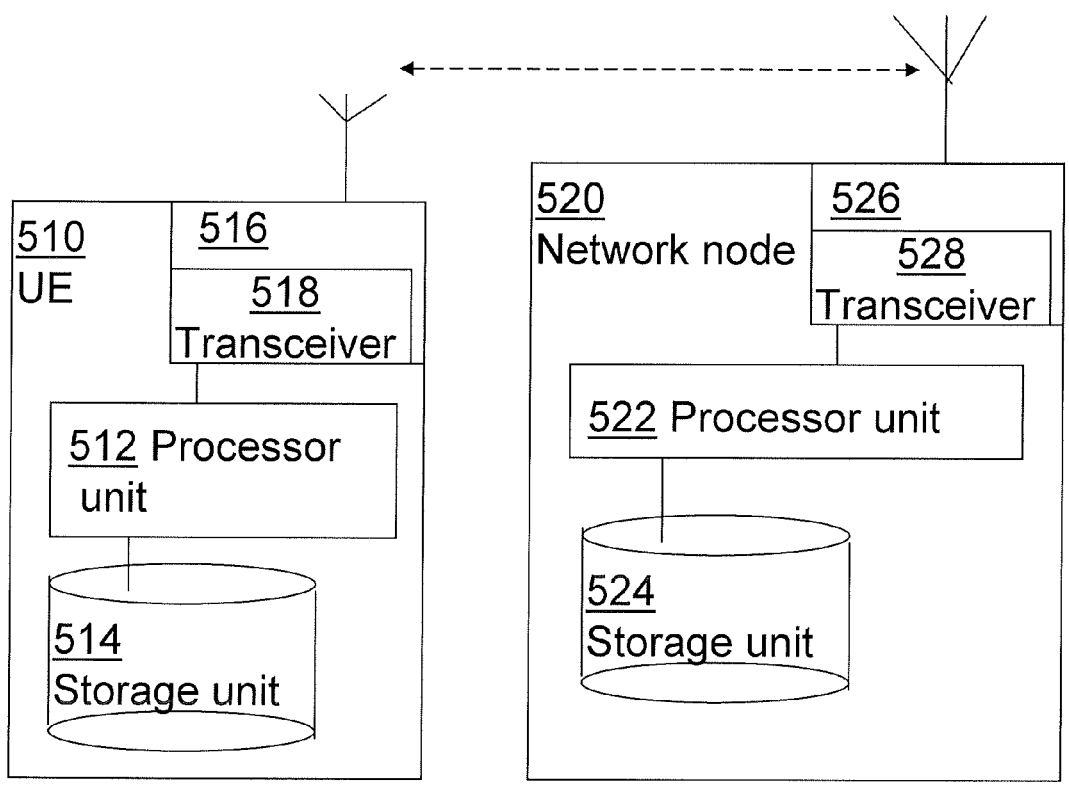
FIG. 5 is a block diagram illustrating the user equipment and the network node according to embodiments.

FIG. 5 is a schematic block diagram schematically illustrating an exemplary UE 510 that is configured to communicate with an exemplary network node 520 comprised in a cellular communication system. The UE 510 and network node 520 can be implemented using various components, both hardware and software. It should be noted that the network node may serve several UEs. However, for simplicity reasons only one UE is illustrated in the figure.

For example, as shown generally in FIG. 5, such a UE 510 include a processor unit 512, one or more storage devices 514, an operating system (not shown) running on the processor unit 512 as well as a corresponding application, e.g., an application which processes measurement data in the manner described above. Additionally, such a network node 520 include a processor unit 522, one or more storage units 524, an operating system (not shown) running on the processor unit 522 as well as a corresponding application, e.g., an application which processes measurement data in the manner described above. Both the UE 510 and the network node 520 may comprise an interface unit 516, 526 to facilitate communications between the UE 510 and the network node 520. For example, the interface unit 516, 526 may include a transceiver capable of communicating wirelessly over an air interface, e.g., as specified by LTE, including hardware and software capable of performing the necessary modulating, coding, filtering and the like, as well as demodulating and decoding to process such signals.

The transceiver unit 518 comprised in the UE 510 is adapted to receive a time reference $T_{ref}$ from the network node 520. The processor unit 512 is adapted to store the received time reference $T_{ref}$ in a measurement log which may be comprised in the storage unit 514. The processor unit 512 is further adapted to start an internal clock function when receiving the time reference $T_{ref}$ from the network node 520. Furthermore, the processor unit 512 is adapted to execute measurements in the cell and to store the measurement data with a determined value of the internal clock function in the measurement log comprised in the storage unit 514. The transceiver 518 is adapted to send an indication to the network node 520 that the measurement log is available and to receive a request to deliver the measurement log from the network node 520. Finally, the transceiver 518 comprised in the UE 510 is further adapted to deliver the measurement log to the network node 520.

Moreover, the transceiver 528 comprised in the network node 520 is adapted to send a time reference $T_{ref}$ to the UE 510. It is further adapted to receive an indication from the UE 510 that a measurement log is available. The transceiver 528 is also adapted to send a request to deliver the measurement log to the UE 510 and then to receive the measurement log from the same. The processor unit 522 comprised in the network node 520 is adapted to then compare the measurement logs of at least two user equipments 510 by comparing measurement data logged at a value of time of an internal clock function of the respective user equipment 510 with respect to the sent time references $T_{ref}$.

The embodiments may, of course, be carried out in other ways than those specifically set forth herein without departing from essential characteristics of the embodiments described. The present embodiments are to be considered in all respects as illustrative and not restrictive.

The invention claimed is:

1. A method in a user equipment for enabling processing of measurement data, the user equipment configured to communicate with a network node in a cellular communication system, the user equipment having a measurement log for storing measurement data and time reference information, the method comprising:
   receiving a time reference from the network node;
   starting an internal clock at the reception of the time reference;
   storing the time reference in the measurement log;
   sending an indication to the network node that the measurement log is available;
   executing one or more measurements;
   storing measurement data from the measurements with a determined value of the internal clock in the measurement log, the determined value of the internal clock being an amount of time elapsed relative to the time reference received;
   receiving a request to deliver the measurement log from the network node;
   delivering the measurement log to the network node.

2. The method of claim 1, wherein the internal clock is a counter.

3. The method of claim 2, wherein the counter is stepped one step by every second.

4. The method of claim 1, wherein the time reference is a time-of-day and date indication.

5. The method of claim 1, wherein the executing one or measurements is performed periodically.

6. The method of claim 1, wherein the measurement is a downlink pilot signal strength measurement of serving cell or neighbor cell.

7. The method of claim 1, wherein the measurement is a downlink pilot signal quality measurement of serving cell or neighbor cell.

8. A user equipment for enabling processing of measurement data, the user equipment configured to communicate with a network node in a cellular communication system, the user equipment comprising:
   a storage device configured to store a measurement log in which measurement data and time reference information are stored;
   a processor circuit configured to:
      start an internal clock when a time reference is received;
      store the time reference in the measurement log;
      execute a measurement; and
      store the measurement data with a determined value of an internal clock in the measurement log, the determined value of the internal clock being an amount of time elapsed relative to the time reference;
   a transceiver configured to:
      send an indication to the network node that the measurement log is available;
      receive the time reference from the network node;
      receive a request to deliver the measurement log from the network node;
      deliver the measurement log to the network node.

9. The user equipment of claim 8, wherein the internal clock is a counter.

10. The user equipment of claim 9, wherein the counter is stepped one step by every second.

11. The user equipment of claim 8, wherein the time reference is a time-of-day and date indication.

12. The user equipment of claim 8, wherein the processor circuit is configured to execute the measurement periodically.

13. The user equipment of claim 8, wherein the measurement is a downlink pilot signal strength measurement of serving cell or neighbor cell.

14. The user equipment of claim 8, wherein the measurement is a downlink pilot signal quality measurement of serving cell or neighbor cell.

15. A method, in a network node, for processing of measurement data, the network node being in a cellular communication system and configured to communicate with user equipment, the method comprising:
for two or more user equipment:
sending a time reference to the user equipment;
receiving an indication from the user equipment that a measurement log is available;
sending a request, to the user equipment, to deliver the measurement log;
receiving the measurement log from the user equipment;
comparing the measurement logs of at least two of the two or more user equipment by comparing measurement data having been logged with corresponding values of an internal clock of the respective user equipment, the corresponding values of the internal clocks being a time elapsed relative to the time references sent to the respective user equipment.

16. The method of claim 15, wherein at least one of the sent time references is a time-of-day and date indication.

17. The method of claim 15, wherein the measurement logs comprise downlink pilot signal strength measurements of served cell or neighbor cell.

18. The method of claim 15, wherein the measurement logs comprise downlink pilot signal quality measurements of served cell or neighbor cell.

19. A network node for processing of measurement data, the network node being in a cellular communication system and configured to communicate with user equipment, the network node comprising:
a transceiver configured to, for two or more user equipment:
receive an indication from the user equipment that a measurement log is available;
send a time reference to the user equipment;
send a request to deliver the measurement log to the user equipment;
receive the measurement log from the user equipment;
a processor circuit configured to compare the measurement logs of at least two of the two or more user equipment by comparing measurement data having been logged with corresponding values of an internal clock of the respective user equipment, the corresponding values of the internal clocks being a time elapsed relative to the time references sent to the respective user equipment.

20. The network node of claim 19, wherein at least one of the sent time references is a time-of-day and date indication.

21. The network node of claim 19, wherein the measurement logs comprise downlink pilot signal strength measurements of served cell or neighbor cell.

22. The network node of claim 19, wherein the measurement logs comprise downlink pilot signal quality measurements of served cell or neighbor cell.

* * * * *

UNITED STATES PATENT AND TRADEMARK OFFICE
CERTIFICATE OF CORRECTION

PATENT NO. : 8,965,358 B2  
APPLICATION NO. : 13/703238  
DATED : February 24, 2015  
INVENTOR(S) : Palm Page 1 of 1

It is certified that error appears in the above-identified patent and that said Letters Patent is hereby corrected as shown below:

On the title page

On Page 2, item (56), under "OTHER PUBLICATIONS", in Column 1, Line 5, delete "Mdt" and insert -- MDT --, therefor.

On Page 2, item (56), under "OTHER PUBLICATIONS", in Column 1, Line 10, delete "weden;.May" and insert -- Sweden; May --, therefor.

In the specification

In Column 1, Line 30, delete "following." and insert -- following: --, therefor.

In Column 3, Lines 28-29, delete "underdetermined." and insert -- undetermined. --, therefor.

In Column 3, Line 31, delete "DRATFT;" and insert -- DRAFT; --, therefor.

Signed and Sealed this  
Twenty-third Day of February, 2016

Michelle K. Lee  
*Director of the United States Patent and Trademark Office*